(12) United States Patent  (10) Patent No.: US 6,798,594 B2
Belser  (45) Date of Patent: Sep. 28, 2004

(54) POSITION SENSING SYSTEM FOR A DISC DRIVE USING MICRO-SERVO SECTORS AND SIDE-BY-SIDE R/W RECORDING ELEMENTS

(75) Inventor: Karl Arnold Belser, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 258 days.

(21) Appl. No.: 09/891,446

(22) Filed: Jun. 26, 2001

(65) Prior Publication Data

US 2002/0067563 A1 Jun. 6, 2002

Related U.S. Application Data

(60) Provisional application No. 60/239,301, filed on Oct. 10, 2000.

(51) Int. Cl.$^7$ .......................... G11B 27/36; G11B 5/596; G11B 5/09
(52) U.S. Cl. ................. 360/53; 360/77.08; 360/48; 360/31; 360/51; 324/210; 324/212
(58) Field of Search ................ 360/77.01, 75, 360/53, 78.04, 104, 31, 51, 77.08; 369/44; 324/210, 212

(56) References Cited

U.S. PATENT DOCUMENTS

| | | | | |
|---|---|---|---|---|
| 4,827,462 A | * | 5/1989 | Flannagan et al. | 369/30.09 |
| 5,229,901 A | * | 7/1993 | Mallary | 360/244 |
| 5,579,189 A | | 11/1996 | Morehouse et al. | 360/105 |
| 5,644,457 A | | 7/1997 | Llewellyn et al. | 360/121 |
| 5,684,651 A | | 11/1997 | Yaegashi et al. | 360/77.08 |
| 5,696,646 A | * | 12/1997 | Satoh | 360/78.04 |
| 5,760,983 A | | 6/1998 | Cowen | 360/48 |
| 5,760,986 A | | 6/1998 | Morehouse et al. | 360/67 |
| 5,793,555 A | | 8/1998 | Belser et al. | 360/75 |
| 5,835,303 A | | 11/1998 | Morehouse et al. | 360/97.01 |
| 5,867,340 A | | 2/1999 | Morehouse et al. | 360/77.04 |
| 5,872,676 A | | 2/1999 | Smith et al. | 360/77.03 |
| 5,912,779 A | | 6/1999 | Llewellyn et al. | 360/55 |
| 6,002,539 A | | 12/1999 | Smith et al. | 360/65 |
| 6,014,282 A | * | 1/2000 | Ito | 360/75 |
| 6,154,335 A | | 11/2000 | Smith et al. | 360/75 |
| 6,172,836 B1 | * | 1/2001 | Bang | 360/75 |
| 6,185,174 B1 | | 2/2001 | Belser | 369/59 |
| 6,469,855 B1 | * | 10/2002 | Lamberts et al. | 360/60 |

* cited by examiner

Primary Examiner—David Hudspeth
Assistant Examiner—Glenda P. Rodriguez
(74) Attorney, Agent, or Firm—David K. Lucente; Derek J. Berger

(57) ABSTRACT

A transducer position sensing system in a disc drive to take frequent data measurements from micro-servo sectors on the disc and to interpret the information to predict recording failures. The disc drive is formatted with many small or micro-servo sectors containing, among other things, a servo address mark, encoded disc location information, and radial track position information. The sensing system frequently retrieves this information through the transducer, compares the measurements to expected values, and given unexpected measurements predicts errors. The time elapsed between the passing of servo address marks can be used to predict adjacent sector overwrites. The radial track position information can be used to predict off-track write errors. The radial track position signal amplitude can be used to predict the transducer moving too far from the disc, resulting in skip write errors.

10 Claims, 10 Drawing Sheets

POSITION SENSING SYSTEM FOR A DISC DRIVE USING MICRO-SERVO SECTORS AND SIDE-BY-SIDE R/W RECORDING ELEMENTS

RELATED APPLICATIONS

This application claims priority of U.S. provisional application Serial No. 60/239,301, filed Oct. 10, 2000.

FIELD OF THE INVENTION

This application relates generally to characterizing the positioning of recording heads over tracks divided into physical sectors in a disc drive, and more particularly to a position sensing system utilizing small servo sectors and side-by-side read/write (R/W) recording heads designed to, while minimally affecting performance, predict write error occurrences by sampling and analyzing recording head position data acquired from the small servo sector and side-by-side R/W recording head configuration.

BACKGROUND OF THE INVENTION

Disc drives are data storage devices that store digital data in magnetic form on a rotating storage medium called a disc. Modern disc drives comprise one or more rigid discs that are coated with a magnetizable medium and mounted on the hub of a spindle motor for rotation at a constant high speed. Each surface of a disc is divided into several thousand tracks that are tightly packed concentric circles similar in layout to the annual growth rings of a tree. The tracks are typically numbered starting from zero at the track located outermost the disc and increasing for tracks located closer to the center of the disc. Each track is further broken down into data sectors and servo bursts. A data sector is normally the smallest individually addressable unit of surface area in which to store information on a disc in a disc drive and typically holds 512 bytes of information plus a few additional bytes for internal drive control and error detection and correction functions. This organization of data allows for easy access to any part of the disc surface.

A servo burst, also known as a servo sector, is a particular magnetic signature on a track that facilitates positioning of read/write (R/W) transducers or heads accurately over the tracks. Servo sectors cross track boundaries, and can be envisioned essentially as radial spokes of a wheel. The conventional format of a servo sector is as follows. The first element of a servo sector is the variable frequency oscillator (VFO) field. This is also often referred to as an AGC field. Typically, the VFO field accounts for one half the size, or length, of a servo sector. The purpose of the VFO field is to generate an on-the-fly frequency by which subsequent servo sector data can be read. Following the VFO field is typically a servo address mark (SAM), This is also often referred to as a servo timing mark, and is typically approximately 10 bits of data. The purpose of the SAM is to indicate the starting point of the servo sector data. Following the SAM is the servo sector data. This data contains track address information, describing which track the head is on. Finally, after the servo sector data is the PES (position error signal). This is also oftentimes referred to as the vernier position signal. The purpose of the PES is to provide a means for the control system to determine the center of the track for proper head positioning.

Generally, each of the multiple discs in a disc drive has associated with it two heads (one adjacent the top surface of the disc, and another adjacent the bottom) for reading and writing data to a sector. A typical disc drive has two or three discs. This usually means there are four or six heads in a disc drive carried by a set of actuator arms. Data is accessed by moving the heads from the inner to outer part of the disc (and vice-versa) driven by an actuator assembly. The heads that access sectors on discs are locked together on the actuator assembly. For this reason, all the heads move in and out together and are always physically located at the same track number (e.g., it is impossible to have one head at track 0 and another at track 500). Because all the heads move together, each of the tracks on all discs is known as a cylinder for reasons that these tracks form a cylinder since they are equal-sized circles stacked one on top of the other in space. So, for example, if a disc drive has four discs, it would normally have eight heads, and a cylinder number 680 would be made up of a set of eight tracks, one per disc surface, at track number 680. Thus, for most purposes, there is not much difference between tracks and cylinders since a cylinder is basically a set of all tracks whereat all the heads are currently located.

One of the heads must first be positioned over the correct location of a sector on the disc in order to access (i.e., read from or write to) the sector. This requires the heads to move to the correct track and then wait for the correct sector to pass under the appropriate head. Moving the heads to the correct track is referred to as a seek. Once a seek has finished and while the disc rotates to a correct sector, the servo mechanism continuously interprets servo sector information from the track to ensure the head remains positioned correctly. Essentially, servo sectors, also known as servo bursts, aid in steering the head over the track.

FIG. 3 is a schematic representation of a conventional servo sector 200 recorded on a disc in a sectored servo control system scheme. Five typical concentric tracks 202, 204, 206, 208, and 210 are pictured sequentially in the vertical direction. The horizontal lines in FIG. 3 indicate the track boundaries. The servo sector format is interpreted from left to right partitioned bit-wise. The first field is simply a 2 bit gap 212. The gap is used to indicate separation of the servo sector from the previous data sector. The second field is the variable frequency oscillator (VFO) field 214. The VFO field 214 is typically equal to half the length of the entire servo sector 200. The purpose of the VFO field 214 is to generate a frequency for the data sampling rate to lock onto in order to precisely time the reading of subsequent servo sector information bits. Following the VFO field 214 is a servo timing mark, or servo address mark (SAM) 216. The SAM 216 is typically 10 bits in length and indicates the start of subsequent servo sector information bits. Following the SAM 216, there are several bits of information indicating the track 152 address according current precise location on the disc 108. In the illustrated format, there are 18 bits of track address information 218. Following the track address information 218, there are 12 bits of vernier position error signal normal (PES_N) 220, followed by 12 bits of vernier position error signal quadrature (PES_Q) 222. The PES signals 220, 222, are used to steer the recording head affixed to the actuator assembly over the center of the track, e.g. track 204. Finally, there are 2 additional bits of gap 224.

Recording transducers or heads consist of two elements: a read element, or reader, and a write element, or writer. Conventionally, the reader and writer element are positioned sequentially in a recording head. This is also referred to as a piggyback configuration. FIG. 5 is a schematic bottom view of a convention piggyback recording head 300 and a corresponding track 204 on a disc. The reader and writer of the recording head 300 are oriented such that they fly over the same track. The reader and writer each has a corresponding read gap 304 and write gap 302. Due to the piggyback configuration, a distance 306, typically 5 µm, separates these gaps. Also pictured is a track 204 with data sectors 226 surrounding a servo sector 200. During operation, the disc rotates such that the track 204 passes under the piggy-back recording head 300 from right to left in the direction indicated by the arrow 308. A piggy-back recording head 300 can only read or write at any given time, and since a piggy-back recording head 300 must first read a servo sector 200 before it may write the subsequent data sector 226, a gap 306 equal to the distance between the read gap 304 and write gap 302 also exists on the disc media as shown.

Thus, as the disc passes under the head, the reader reads servo information until a data sector is to be read or written. When a data sector is to be written, the disc rotates until the servo sector just passes under the read head. At this point, the writer may begin to write data. Due to the gap between the reader and the writer, there is therefore an amount of wasted space on the disc after each servo sector equal to the gap 306. This wasted space is of no concern in conventional disc drives due to the relatively small number of servo sectors spaced around the disc surface.

As with any data storage and retrieval scheme, data integrity is critical. The reliability of a hard disc drive is desired to be less than 1 data loss in one trillion data accesses, or less than 1 read failure in $10^{12}$ attempted read operations. Often, for various reasons such as defective media, improper head positioning, extraneous particles between the head and media, or marginally functioning components, disc drives may sometimes record or read data incorrectly to or from the disc. A predominant cause for failed data reads is that the initial write operation of a particular sector was unsuccessful. Unsuccessful writes are usually attributed to improper positioning of the recording head over the media which is caused by either an extraneous particle between the head and media, or by physical shocks imposed on the disc drive itself, causing the servo mechanism to jolt.

External shocks experienced by the disc drive can cause write failures, and the failures can be divided into three categories. In once case, a rotational shock essentially bumps the head in the circumferential direction, lengthening or shortening the periodic spacing of bits being written. This can result in overwriting an adjacent sector on the same track, and is referred to as a "adjacent sector overwrite". In a second case, a rotational shock might bump the recording head in a radial direction, causing the head to be positioned off track. This can result in writing to an incorrect sector on an incorrect track, and is referred to as a "write fault". In a third case, a translational shock or asperity might cause the recording head to jump from the disc resulting in too great a distance between the head and the disc. This can result in failing to correctly record data to a sector, and is referred to as a "skip write".

Conventionally, minimizing the number of write errors in a disc drive is accomplished by minimizing track mis-registration. Essentially, track mis-registration, also referred to as RMS servo error, is a characterization of how precisely a recording head is positioned over a track. A greater RMS servo error would indicate a more improperly positioned head, and a higher probability of incorrectly recorded data during a write operation. To this end, a disc drive servo system is conventionally designed with a particular amount of tolerance, directed to minimize RMS servo error. The problem with this method is that the disc drive is not actually designed to detect and correct actual particular write failures. Rather, it is designed on a statistical basis to withstand certain shocks and anomalies, utilizing a range of tolerance for error. Moreover, as disc drive designs continue to evolve, the number of tracks on a disc, or track density, will continue to increase. As track density increases, the distance between tracks, or track pitch, will decrease. As track pitches continue to become smaller, for example to 170 µm, the conventional servo system that minimizes RMS servo error will no longer be able to statistically withstand common shocks and anomalies. A jolt may now cause a head to move halfway off track. In the future, the same jolt may cause a head to move several tracks off. Consequently, write failures and subsequent read failures will increase rendering the conventional servo system unusable.

Accordingly there is a need for a servo position sensing system to actually ensure the recording head is positioned over the correct sector and track while minimally affecting a disc drive's storage capacity.

SUMMARY OF THE INVENTION

Against this backdrop embodiments of the present invention have been developed. Embodiments of the present invention essentially involve a unique recording head facilitating a system to take frequent measurements of the position of the recording head with respect to the disc to ensure positioning tolerances are met during operation, while minimally affecting the disc drive's storage capacity. To accomplish this task, each of the three types of write failures are individually addressed, and a system for measuring and establishing parameters that characterize the recording head position responsible for each mode of failure is utilized.

More specifically, a rotational shock that would cause an adjacent data sector to be overwritten can be detected by measuring the amount of time that elapses from the moment the bead passes over the sector address mark (SAM) of adjacent sectors. Given the known rotational velocity of the disc, and rotational distance between adjacent servo sectors, the disc drive can calculate the expected time delay between SAMs. If the delay is outside tolerance, the disc drive can predict an adjacent sector overwrite. A rotational shock that would cause a write fault can be detected by interpreting the PES in the servo sectors. If the disc drive detects an incorrect position error signal (PES), an off-track write fault can be predicted. A translational shock that would cause a skip write can be detected by comparing the amplitude of the PES signal to an expected value. If the recording head moves too far from the disc, the amplitude would be outside of tolerance, and a skip write can be predicted.

The number of servo sectors on a disc must be increased to acquire enough parametric data to accurately interpret the above measurements. However, increasing the number of servo sectors results in a substantial amount of non-user data on the disc, decreasing the disc drive's storage capacity. A method in accordance with one preferred embodiment of the invention compensates for this by decreasing the size (length) of the servo sector format needed. Finally, the cumulative effect of the unused reader to writer gap space resulting from the piggy-back recording head configuration for each of the increased number of servo sectors becomes a predominant factor for unused storage space on the disc and thus a revised recording head configuration is provided to remove the write gap and thus regain usable disc real estate for data storage.

An embodiment of the invention utilizes a side-by-side read/write element configuration to eliminate this gap. In addition, a large number of micro-servo sectors recorded on the disc surfaces provides frequent position information to the control system to enable detection of track mis-registrations and shock events. Essentially, a disc is formatted with a large number of small servo sectors. The servo sectors further comprise a unique format by which track and disc location is stored. A unique side-by-side recording head is utilized in conjunction with the small servo sectors. The disc drive takes, through the recording head passing over the numerous servo sectors, frequent measurements that can be used to characterize the position of the recording head in reference to the disc surface. The disc drive therefore, in effect, without affecting capacity or performance, verifies that data is likely to be correctly written to the disc. These and various other features as well as advantages that characterize the present invention will be apparent from a reading of the following detailed description and a review of the associated drawings.

DETAILED DESCRIPTION

Figure 1:
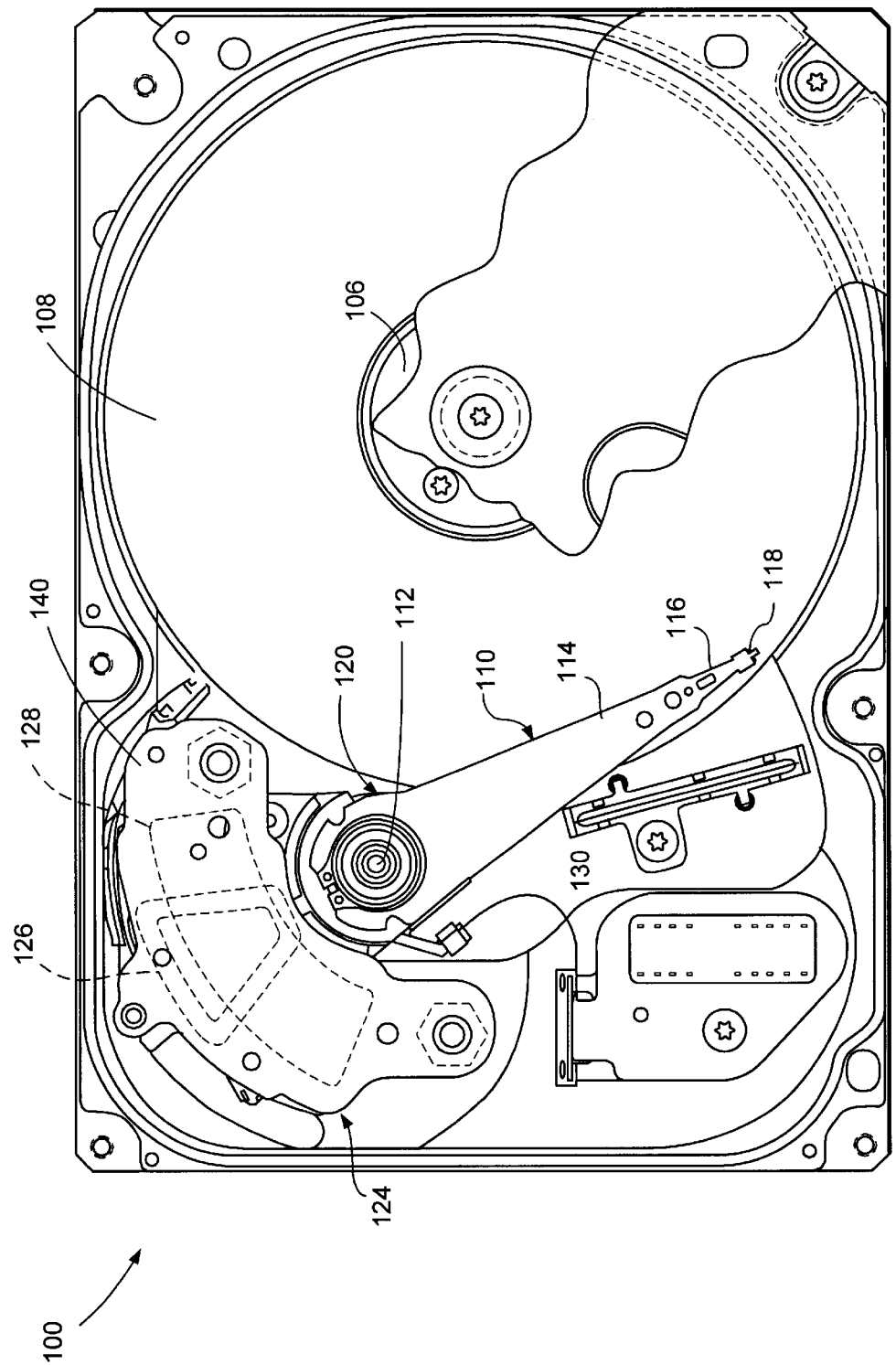
FIG. 1 is a plan view of a disc drive incorporating a preferred embodiment of the present invention with portions broken away showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates a stack of one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a preamplifier 132 to which head wires (not shown) are connected; the head wires being routed along the actuator arms 114 and the flexures 116 to the heads 118. The preamplifier 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
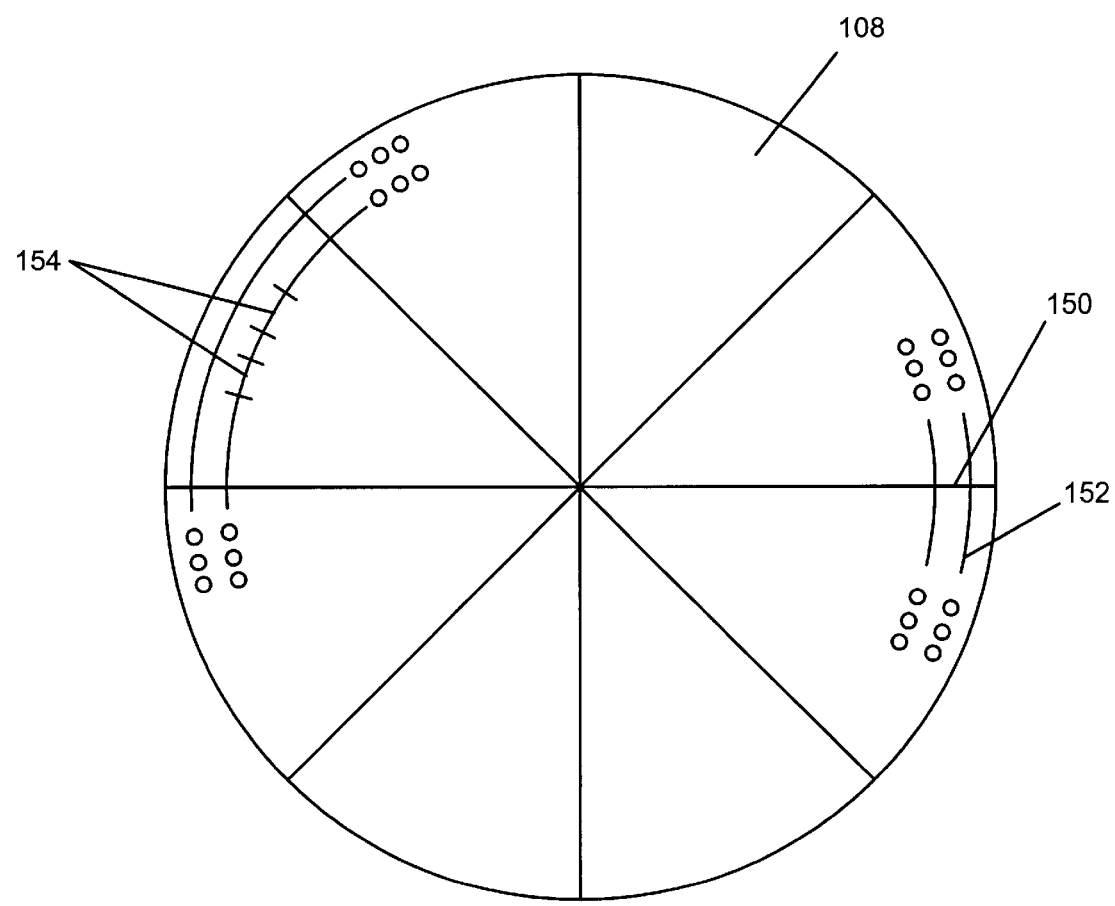
FIG. 2 is a simplified schematic plan view of a disc drive disc showing a basic servo wedge/sector configuration in accordance with the invention.
Figure 3:
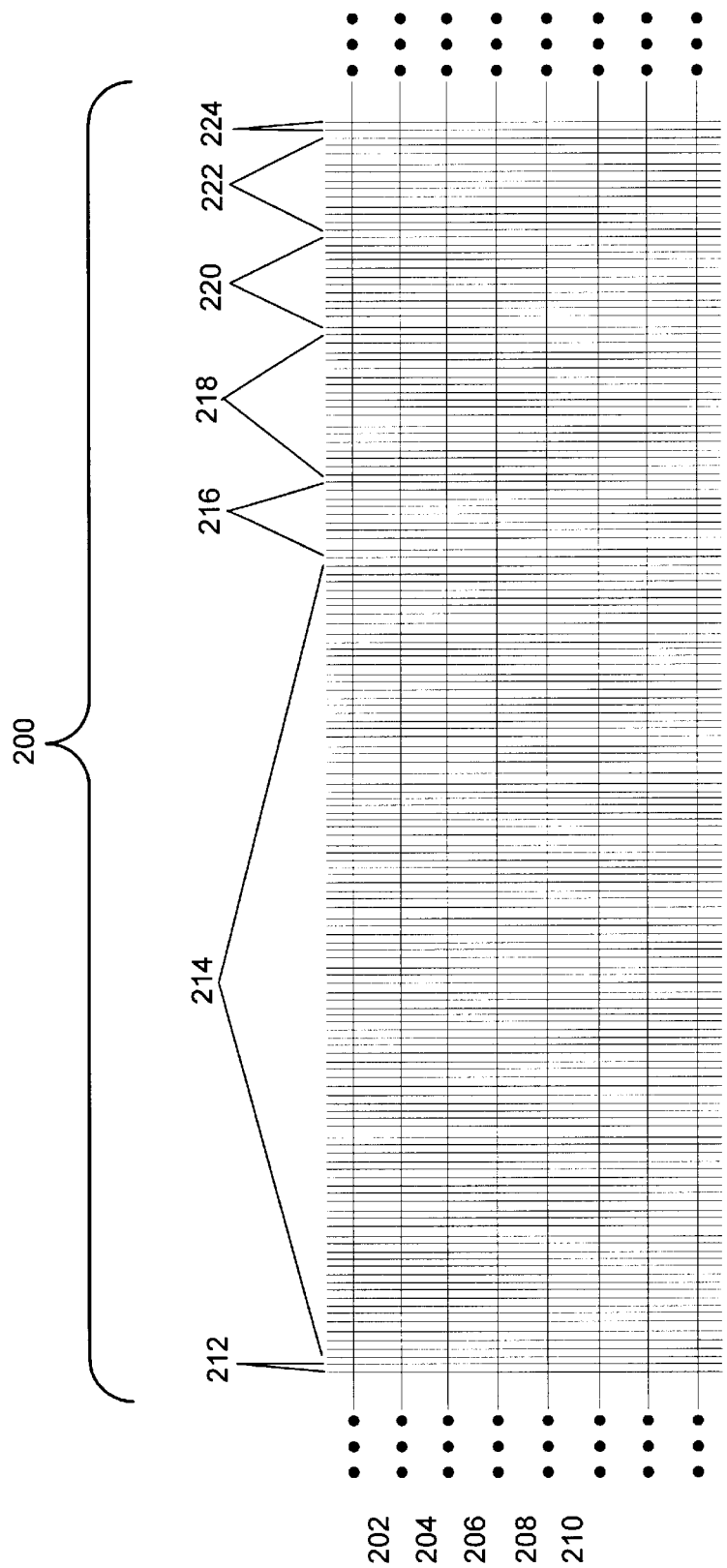
FIG. 3 is a schematic representative view of a servo sector in a conventional disc drive.

Referring now to FIG. 2, shown therein is a simplified plan view of a typical disc of the disc drive 100 of FIG. 1, generally showing the small servo sector 150 arrangement in an embodiment of the present invention. A disc 108 is pictured having small servo sectors 150 arranged radially on the surface. Only eight sectors 150 are shown in FIG. 2. This is merely representative. There are preferably more than about a thousand of these small servo sectors 150 on the disc surface. Also pictured are sections of circumferential tracks 152 on the disc 108, further divided into data sectors 154. As the disc 108 rotates, recording heads 118 affixed to the actuator assembly 110 are steered over the tracks 152 by reading servo sectors 150 between data sectors 154.

Figure 4:
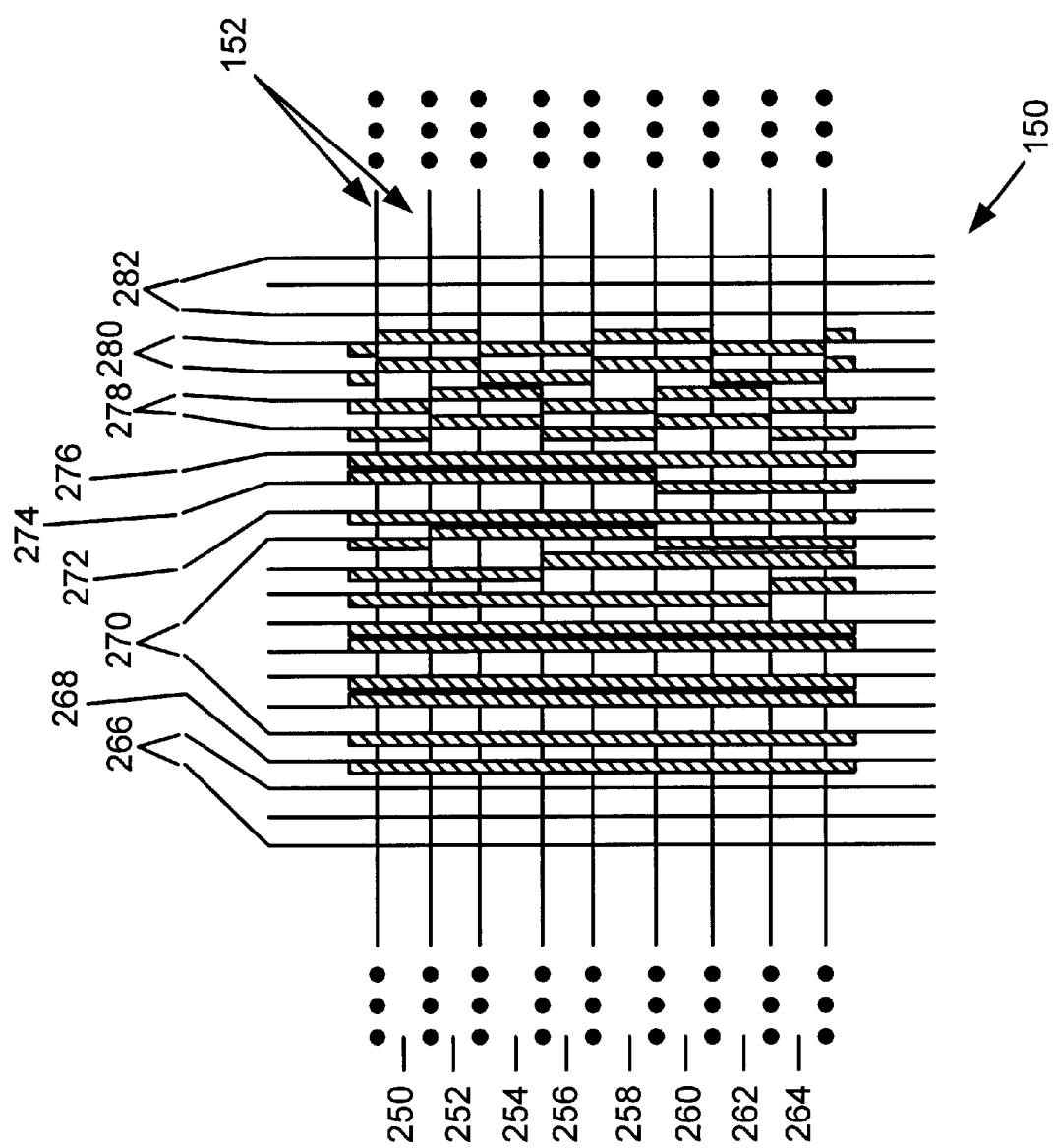
FIG. 4 is a schematic representative view of a small servo sector layout in accordance with a preferred embodiment of the present invention.

FIG. 4 is a schematic expanded representation of the scheme of a preferred embodiment of a small servo sector 150 according to the present invention. The data tracks are pictured sequentially in the vertical direction. The tracks 152 are labeled as individual tracks 250, 252, 254, 256, 258, 260, 262, and 264, the boundaries of which are delineated by the horizontal lines. The small servo sector 150 format is interpreted from left to right partitioned bit-wise. The first field is simply a 3 bit gap 266. The gap 266 is used to indicate separation of the small servo sector 150 from the previous data sector 154 (not identified in FIG. 4). The second field is a servo timing mark, or servo address mark (SAM) 268. The SAM 268 is typically 1 bit in length and indicates the start of subsequent small servo sector 150 information bits. Following the SAM 268, there are several bits of information indicating the current precise location on the disc 108. In the illustrated format, 8 bits of parallel low Gray code 270 are followed by 1 bit of rotation 272, and 1 bit of serial high order Gray code 274. Given an 18 bit data address on a disc 108, it is desirable to encode the address into a sequence of small servo sectors 150. In this preferred embodiment, the lowest 8 bits of the address are encoded and recorded in parallel in Gray code 270, in the small servo sector 150. The high order bits of the address are then encoded in Gray code and recorded serially in Gray code 274 over a span of small servo sectors 150. Following the serial high order Gray code 274, another SAM 276 is recorded. Following the second SAM 276, there are 2 bits of vernier position error signal normal (PES_N) 278, followed by 2 bits of vernier position error signal quadrature (PES_Q) 280. The PES signals 278, 280, are used to steer the recording head 118 affixed to the actuator assembly 110 over the center of the track 152. Finally, there are 2 additional bits of a gap 282.

Advantageously, using a micro-servo sector scheme as described above reduces overhead required for servo information by eliminating the Variable Frequency Oscillator (VFO) field required in other approaches. The VFO field is commonly referred to as the automatic gain control (AGC) field. In an embodiment the servo fields are detected by sampling the whole servo sector at 5 times the servo frequency or greater. The whole servo sector is sampled to generate digital servo sample data, which are stored in memory. The digital servo sample data is used to locate the position of the servo server. The digital servo sample data may be viewed as a pattern including the gaps 266 and 282 at the leading and trailing edges of the servo sectors 150 that can be used to identify the beginnings and endings of the servo sectors 150. Once the digital servo sample data is in memory, the amplitude can be estimated by the peak detection of the timing marks and the digital servo sample data. One way of detecting the peak locations is by using a parabolic peak detector. After the peak locations are detected, the individual bits in the servo sector are detected. For a more detailed description of an apparatus for detecting the locations of the servo sectors 150 that can be employed with an embodiment of the present invention, refer to U.S. Pat. No. 6,185,174 entitled "Disk Drive System Having Hybrid Analog/Digital Pulse Peak Instance/Amplitude Data Detection Channels," by Belser, which is hereby incorporated by reference for all that it teaches and discloses.

Beneficially, servo sector overhead is further reduced by dividing the track address into two parts: the higher order bits. One part consists of the lower order bits of the track address and is stored in the parallel low Gray code 270. The other part of the track address consists of the higher order bits of the track address. In a preferred embodiment, not all of the higher order track address bits are stored, but an encoded version of the higher order track address bits. The encoded versions of the higher order track address bits are stored in the serial high order Gray code 274. Unique codes are employed to determine the encoded versions of the higher order track address bits. Table 1 shown here, contains seven unique codes.

TABLE 1

Exemplary Sequential Codes

| Cycle | Code | Bits Used |
| --- | --- | --- |
| 4 | 0011 | 3 |
| 6 | 001011 | 4 |
| 8 | 00010111 | 4 |
| 10 | 0000110111 | 5 |
| 12 | 000100110111 | 5 |
| 14 | 00010011010111 | 5 |
| 16 | 0000100110101111 | 5 |

A given embodiment can use any of the codes for generating the serial high order Gray code 274. The code that is used depends upon how many bits are stored in the parallel low Gray code 270. The number of bits stored in the parallel low Gray code 270 depends upon the uncertainty of a state estimator (not shown) in the disc drive 100. Disc drives typically include a state estimator that implements a mathematical model for controlling the positioning of the recording head 118. Uncertainty can be reduced by sampling at a higher rate. Generally, the higher the uncertainty, the more bits are required in the parallel low Gray code 270.

As an example of how to use Table 1 to encode the serial high order Gray code 274, assume the track address consists of 16 bits. In the example, further assume that 8 bits are used for the parallel low Gray code 270. The cycle that is used in Table 1 is 8 because the 8 higher order bits of the track address will be encoded in the serial high order Gray code 274. The code 00010111 associated with cycle 8 will be used. Each bit of the code is stored sequentially in the serial high order Gray code 274 in servo sectors 150 around the disc. Because there are many more than 8 servo sectors around a track on the disc, the code will be repeated around the tracks of the disc. The "Bits Used" column indicates a minimum number of code bits required to form a unique decode value to identify the sector number. During operation, decoding involves reading the minimum number of serial high order Gray code 274 sequentially from each servo sector 150 and mapping the unique code to an associated higher order address bit. Because the code sequence is repeated around the tracks, a modulo 8 operation is performed during decoding to determine the unique sector number. The cycle used from the table dictates the modulo number to be used.

The first sector on every track is generally sector 0 and is referred to as an index sector. Index sectors are encoded slightly differently than non-index sectors (sectors other than sector 0) and, as a result, sector 0 is uniquely identifiable during decoding. This can be demonstrated by continuing with the example above wherein 8 track address bits are used for the parallel low Gray code 270 and 8 track address bits are encoded in the serial high order Gray code 274. Each servo sector 150 will have one bit from the "Code" column in Table 1 stored in the serial high order Gray code 274. The code bits are sequentially placed around the tracks on the disc and repeat every 8 sectors. During a seek operation, the servo controller can identify which group of 8 servo sectors the transducer is positioned over by the code bit associated with the servo sector. The tables below illustrate how the code bits are stored in sequential sectors and decoded to determine the servo sector number.

The code bits from Table 1, Cycle 8 appear sequentially in Table 2. All the bits are used for non-index sectors. Encoding is performed by making the total number of servo sectors equal to a multiple of the modulus (or cycle) of the rotational position minus one. In the Cycle 8 example, there are 255 servo sectors per revolution. Consequently, as shown in Table 3, there are only 7 sectors in the last group of sectors so only 7 of the code bits are present. Thus a non-index group of eight servo sectors begins with hexadecimal E and the index group of eight servo sectors starts with a 6, both of which correspond to modulo(SS#,8)=0.

TABLE 2

SERIAL ENCODING OF A NON-INDEX SECTORS

| Servo sector mod 8 | 0 | 1 | 2 | 3 | 4 | 5 | 6 | 7 |
|---|---|---|---|---|---|---|---|---|
| Code Bit | 0 | 0 | 0 | 1 | 0 | 1 | 1 | 1 |

TABLE 3

SERIAL ENCODING OF THE INDEX SECTORS

| Servo sector number | 248 | 249 | 250 | 251 | 252 | 253 | 254 |
|---|---|---|---|---|---|---|---|
| Code Bit | 0 | 0 | 0 | 1 | 0 | 1 | 1 |

Table 4 illustrates the transition around the disc from the last servo sector (servo number 255) to the first servo sector (servo number 0). The index value 6 uniquely identifies servo number 0. Other servo sectors are located by the unique decode value and the cyclically occurring modulo values.

TABLE 4

DECODE TABLE FOR CIRCUMFERENTIAL POSITION

```
Servo         2 2 2 2 2 2 2 2 2 2 2 2 2 2 2 2
Sector        3 3 4 4 4 4 4 4 4 4 4 4 5 5 5 5                      1 1 1 1
Number        8 9 0 1 2 3 4 5 6 7 8 9 0 1 2 3 4  0 1 2 3 4 5 6 7 8 9 0 2 3 4
(SS#)
Code Bit   ... 1 1 0 0 0 1 0 1 1 1 0 0 0 1 0 1 1  0 0 0 1 0 1 1 1 0 0 0 1 0 1 ...
Decode        B 7 E C 8 1 2 5 B 7 E C 8 1 2 5 B6 C 8 1 2 5 B 7 E C 8 1 2 5
Value
Modulo        6 7 0 1 2 3 4 5 6 7 0 1 2 3 4 5 6  0 1 2 3 4 5 6 7 0 1 2 3 4 5
(SS#, 8)                                       |
                                               | ← Index is a "6"
```

Those skilled in the art will recognize how cycles other than 8 and the corresponding codes may be used to encode the track address in a disc.

Figure 5:
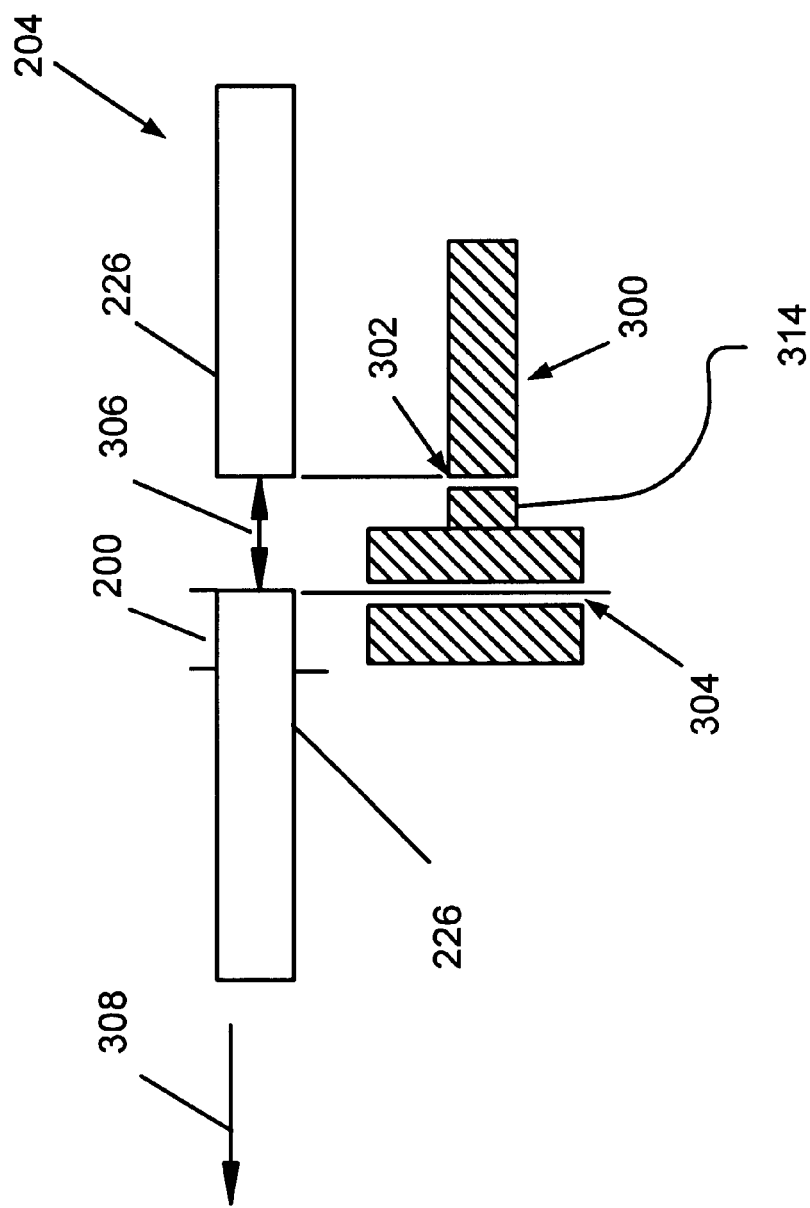
FIG. 5 is a schematic representative view of a conventional piggyback recording head.
Figure 6:
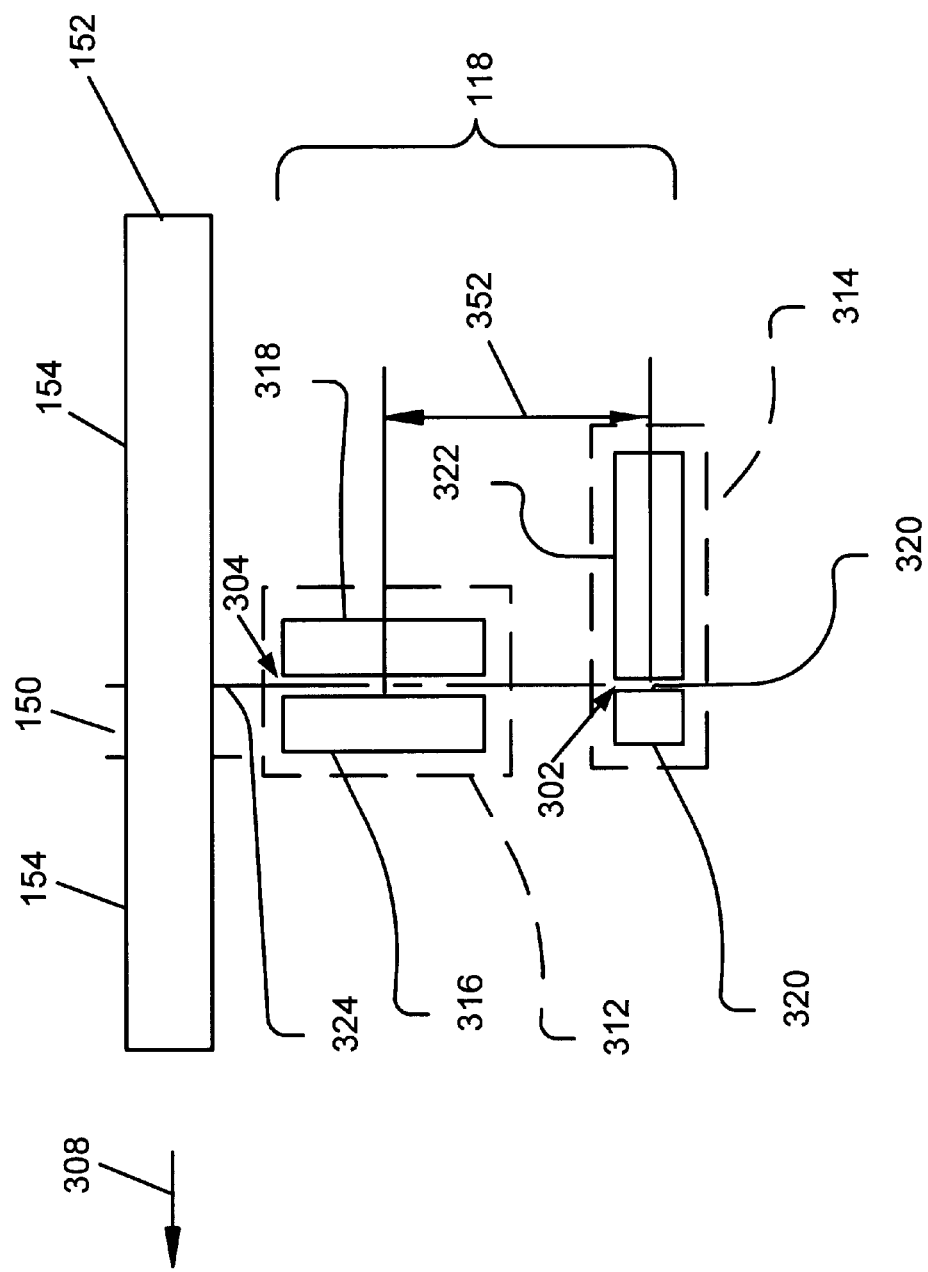
FIG. 6 is a plan view of a side-by-side recording head in accordance with a preferred embodiment of the present invention.

FIG. 6 is a schematic plan view of a side-by-side recording head 118 in accordance with one preferred embodiment of the present invention shown in relation to a track 152. In this case, a reader (also called a read element) 312 and writer (also called a write element) 314 of the side-by-side recording head 118 are positioned such that their read gap 304 and write gap 302 are substantially aligned. The reader 312 and writer 314 are separated by a distance 352, typically ranging from 2 μm to 100 μm. Accordingly, the reader 312 and writer 314 are positioned over different tracks 152 at any given time. Similar to FIG. 5, also illustrated in FIG. 6 is a track 152 with data sectors 154 on either side of a servo sector 150. During operation, the disc 108 rotates such that the track 152 passes under the recording head 118 from right to left in the direction indicated by the arrow 308. As with a piggy-back recording head 300, a side-by-side recording head 118 can only read or write at any given time. Thus the head 118 necessarily reads from one track 152 and writes to a track spaced a predetermined distance away. Since this distance is fixed at a given track location, and the tracks 152 are concentric, the servo control system can appropriately compensate for this offset. Importantly, by interpreting servo sector 150 information from one track 152, and writing data sector 154 information to another track 152, a side-by-side recording head 118 can eliminate the wasted media space 306 illustrated in FIG. 5. Thus, in FIG. 6, there is no gap between the servo sector 150 and the adjacent data sectors 154.

The reader 312 includes a first shield 316 and a second shield 318. The first shield 316 and the second shield 318 define the read gap 304. The writer 314 includes a first pole 320 and a second pole 322. The first pole 320 and the second pole 322 define the write gap 302. The read gap 304 has a center depicted by a center line 324 in FIG. 6. The center line 324 is positioned substantially at the midpoint between the first shield 316 and the second shield 318. Preferably, the reader 312 and the writer 314 are positioned side-by-side in such a way that the center 324 of the read gap 304 is aligned with a trailing edge 320 of the write gap 302.

Figure 7:
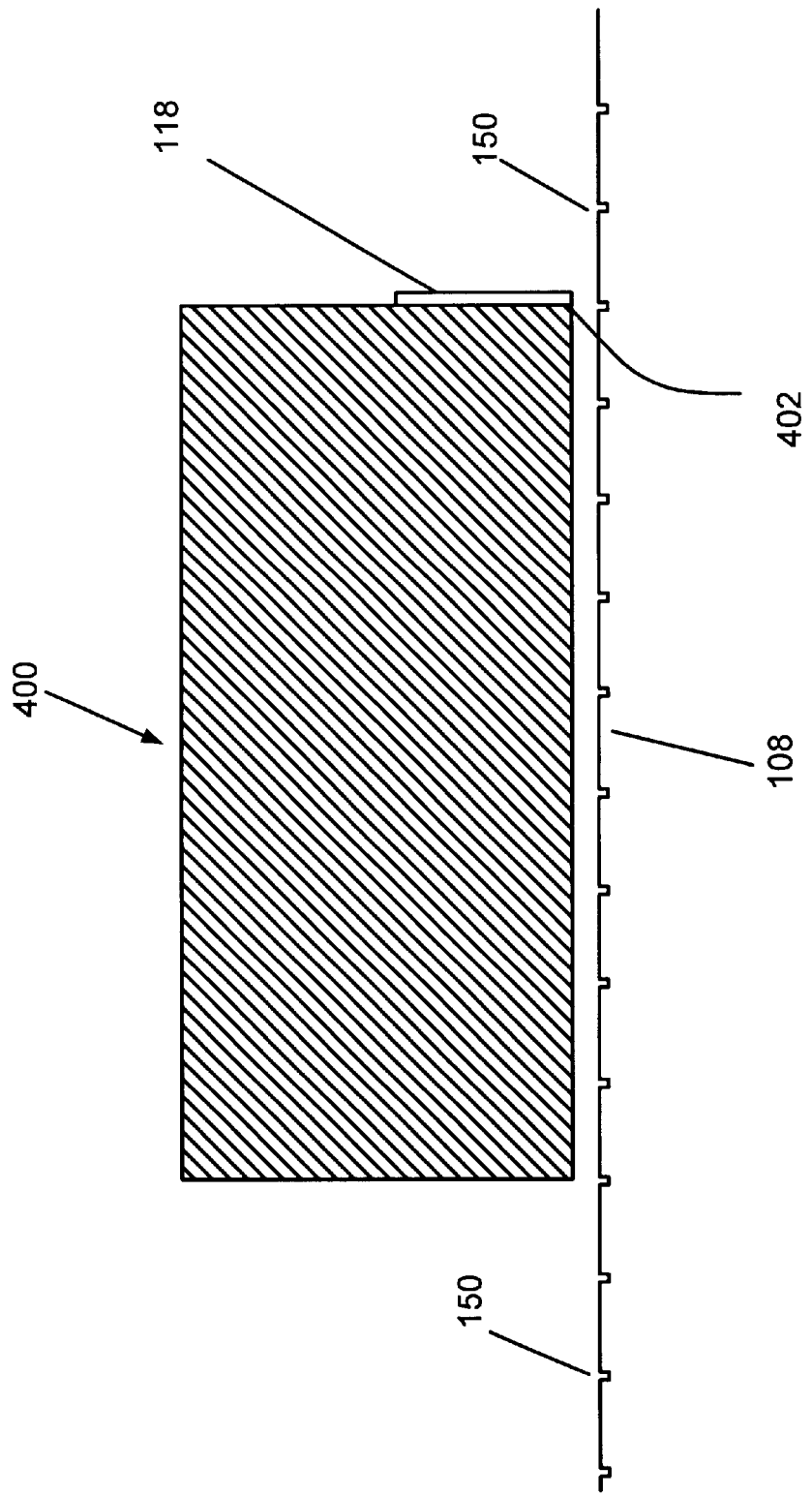
FIG. 7 is a side view of a recording head slider positioned over a disc with media patterned with the small sector layout in accordance with a preferred embodiment of the present invention.

FIG. 7 is a cross-sectional view of a recording head slider 400 positioned over a disc 108 with media patterned with the small servo sector layout 150 in accordance with a preferred embodiment of the present invention. The transducer 118 includes the read element 312 and the write element 314, which are mounted side-by-side on a trailing edge 402 of a slider 400. In application, it is desirable to maintain a steady-state air bearing gap between the disc 108 and slider 400. A typical slider is approximately 1000 μm long, and in the preferred embodiment, the separation of the small servo sectors 150 is 60 μm and 120 μm and the small servo sector 150 length is 3 μm and 6 μm respectively. As a result, the number of small servo sectors 150 under the slider 400 is much greater than that of a conventional configuration. Accordingly, when the media is patterned, an additional benefit of the small servo sector 150 feature is minimized fly height modulation of the slider 400 over the disc 108.

Essentially, the position sensing system functions as follows. As a disc 108 in a disc drive 100 passes under a side-by-side recording head 118, information is read from the small servo sectors 150 by the side-by-side recording head 118. The position sensing system measures the time elapsed from the time the SAM 268 of a first small servo sector 150 and the SAM 268 of a second small servo sector 150 pass under the side-by-side recording head 118. This time measurement is continually updated and can be used to detect a rotational shock that would cause an adjacent data sector 154 to be overwritten. Given the known rotational velocity of the disc 108, and rotational distance between adjacent small servo sectors 150, the disc drive 100 can calculate the expected time delay between consecutive SAMs 268. If the delay is outside a predetermined tolerance or threshold, the disc drive 100 can predict an adjacent data sector 154 overwrite.

The position sensing system also retrieves information to detect a rotational shock that would cause an off-track 152 write fault. In particular, the side-by-side recording head 118 measures and interprets the PES_N 278 and PES_Q 280 in the small servo sectors 150. If the disc drive detects an incorrect PES_N 278 or PES_Q 280, the side-by-side recording head 118 can be considered off-track, and a write fault can be predicted and/or indicated.

The system also retrieves information to detect a translational shock that would cause a skip write fault. The side-by-side recording head 118 measures the amplitude of the PES_N 278 and PES_Q 280 signals. The disc drive 100 servo control compares them to an expected value. If the side-by-side recording head 118 moves too far vertically from the disc 108, the amplitude would be outside of tolerance, and a skip write would be predicted in the disc drive 100.

Figure 8:
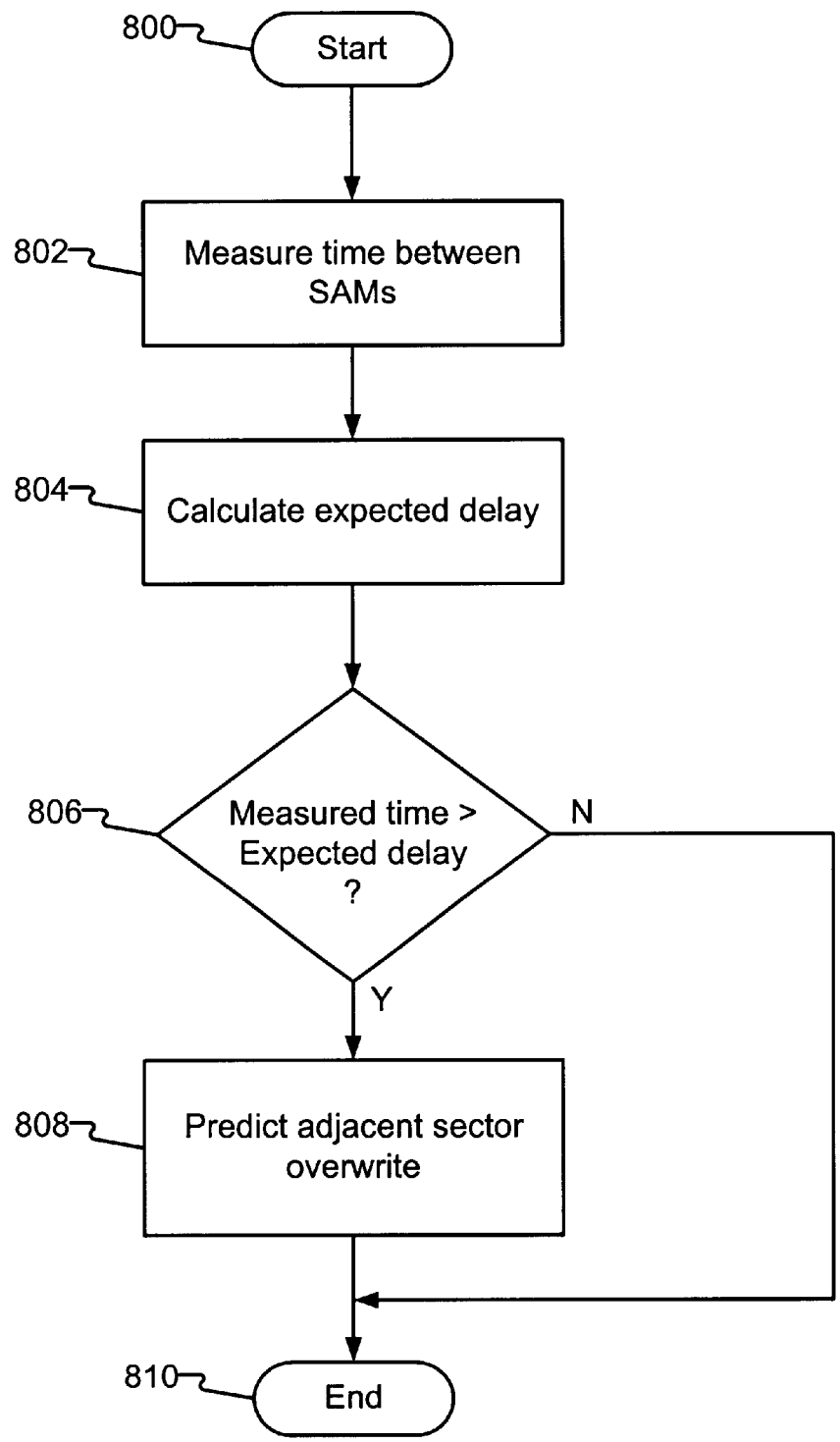
FIG. 8 is a flow chart illustrating exemplary method steps for predicting a sector overwrite error in an embodiment of the present invention.

FIG. 8 is a flow chart illustrating exemplary method steps for predicting a sector overwrite error in an embodiment of the present invention. The method steps illustrated in the flow charts described herein may be implemented using any technology known in the art. By way of example, the method steps illustrated may be implemented with microprocessor executable software stored in memory. The method steps may also be carried out with logic circuits. Typically, a combination of software and logic circuits is employed to implement the method steps illustrated. Control initially transfers to a starting operation 800 wherein initialization processing occurs. Control then transfers to a measuring operation 802 wherein the amount of time elapsed between sequential servo address marks (SAM) 268 is measured. The measured elapsed time is typically stored in memory for later processing. Preferably, the measured elapsed time is determined between two consecutive SAMs 268. Control then transfers to a calculating operation 804 wherein an expected time delay between SAMs 268 is calculated. The expected time delay is typically a function of disc rotation speed and the distance between adjacent servo sectors. The calculated expected time delay is typically stored in memory for later processing. Control then transfers to a comparing operation 806 wherein the measured elapsed time (from the measuring operation 802) between SAMs 268 is compared to the expected elapsed time (from the calculating operation 804). If the measured elapsed time is greater than the expected elapsed time, control transfers to a predicting operation 808 wherein an adjacent sector overwrite error is predicted. In the predicting operation 808, predicting a sector write error can involve, for example, setting a flag in memory to indicate a sector overwrite error. As another example, and not by way of limitation, predicting can include setting a control line of an integrated circuit. If the measured elapsed time is not greater than the expected elapsed time, then control transfers to an end operation 810. After the predicting operation 808 is executed, control transfers to the end operation 810.

Figure 9:
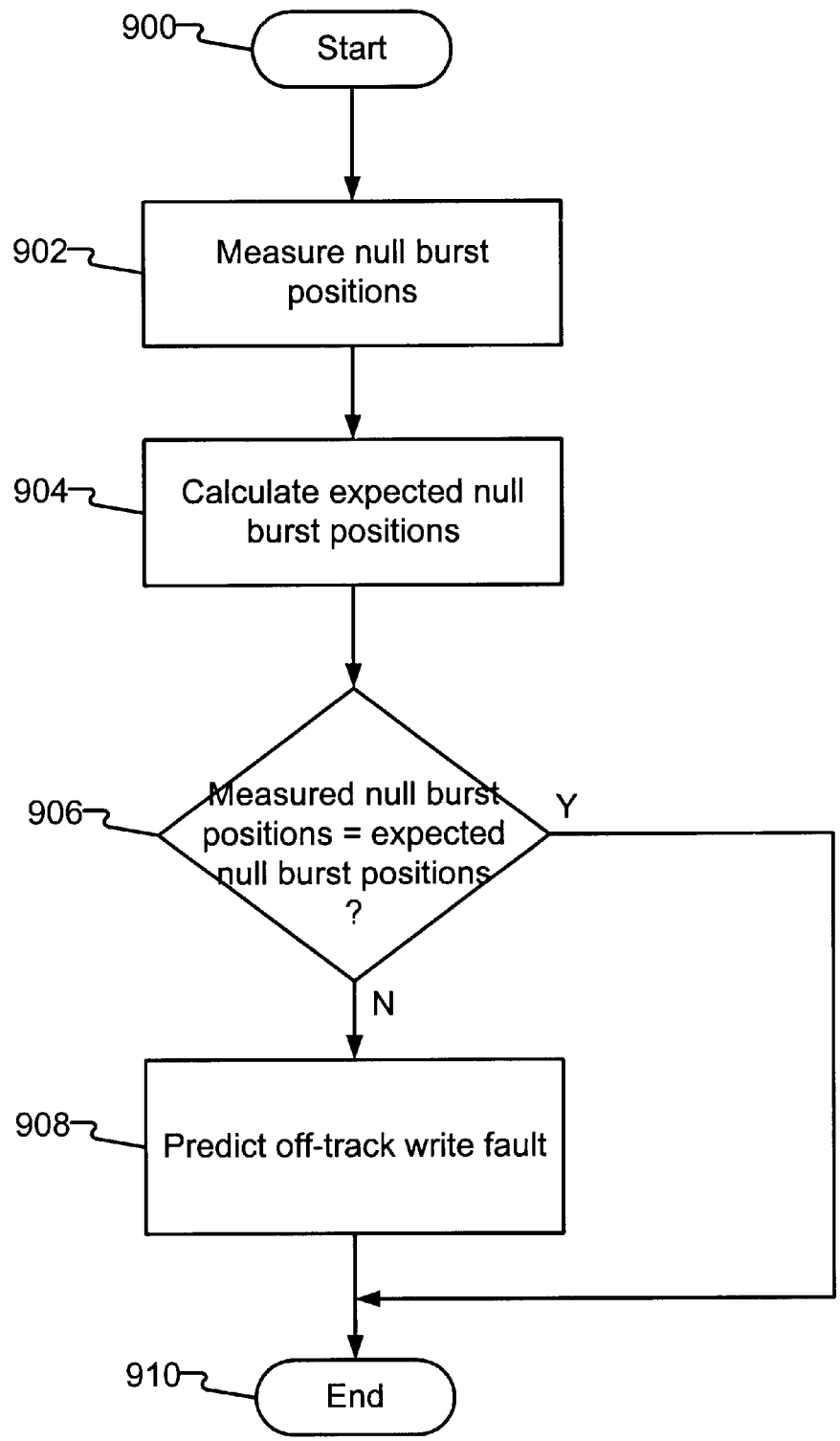
FIG. 9 is a flow chart illustrating exemplary method steps for predicting an off-track write fault in an embodiment of the present invention.

FIG. 9 is a flow chart illustrating exemplary method steps for predicting an off-track write fault in an embodiment of the present invention. Control initially transfers to a starting operation 900 wherein initialization processing occurs. Control then transfers to a measuring operation 902 wherein the positions of null bursts are measured. Preferably, in the measuring operation 902, a null burst position quadrature is measured and a null burst position normal is measured. Control then transfers to a calculating operation 904 wherein expected null burst positions are calculated. The calculating operation 904 includes calculating an expected null burst position quadrature and an expected null burst position normal. Control then transfers to a comparing operation 906 wherein the measured null burst positions (from the measuring operation 902) are compared to the expected null burst positions (from the calculating operation 904). In the comparing operation 906 the measured null burst position normal is compared to the expected null burst position normal and the measured null burst position quadrature is compared to the expected null burst position quadrature.

If the measured null burst position normal differs substantially from the expected null burst position normal or the measured null burst position quadrature is not substantially equal to the expected null burst position quadrature, control transfers to a predicting operation 908. Preferably, in the comparing operation 906 it is determined whether the measured null burst positions differ from the respective expected null burst positions by a predetermined amount. The predetermined amount can be any amount suitable to the environment and may depend on such factors as hardware tolerances and system parameters. The predetermined amount can be stored in memory and used for comparison. Thus, if the measured null burst position quadrature differs from the expected null burst position quadrature by the predetermined amount, then the measured null burst position quadrature is not substantially equal to the expected null burst position quadrature. Likewise, if the measured null burst position normal differs from the expected null burst position normal by the predetermined amount, then the measured null burst position normal is not substantially equal to the expected null burst position normal. In the predicting operation 908, it is predicted that an off-track write fault has occurred or will occur. The predicting operation 908 can include, but is not limited to, setting a flag in memory or setting a control line in logic to indicate an off-track write fault. If the measured null burst positions are substantially equal to the expected null burst positions in the comparing operation 906, control transfers to an end operation 910. Also, after the predicting operation 908 is executed, control transfers to the end operation 910.

Figure 10:
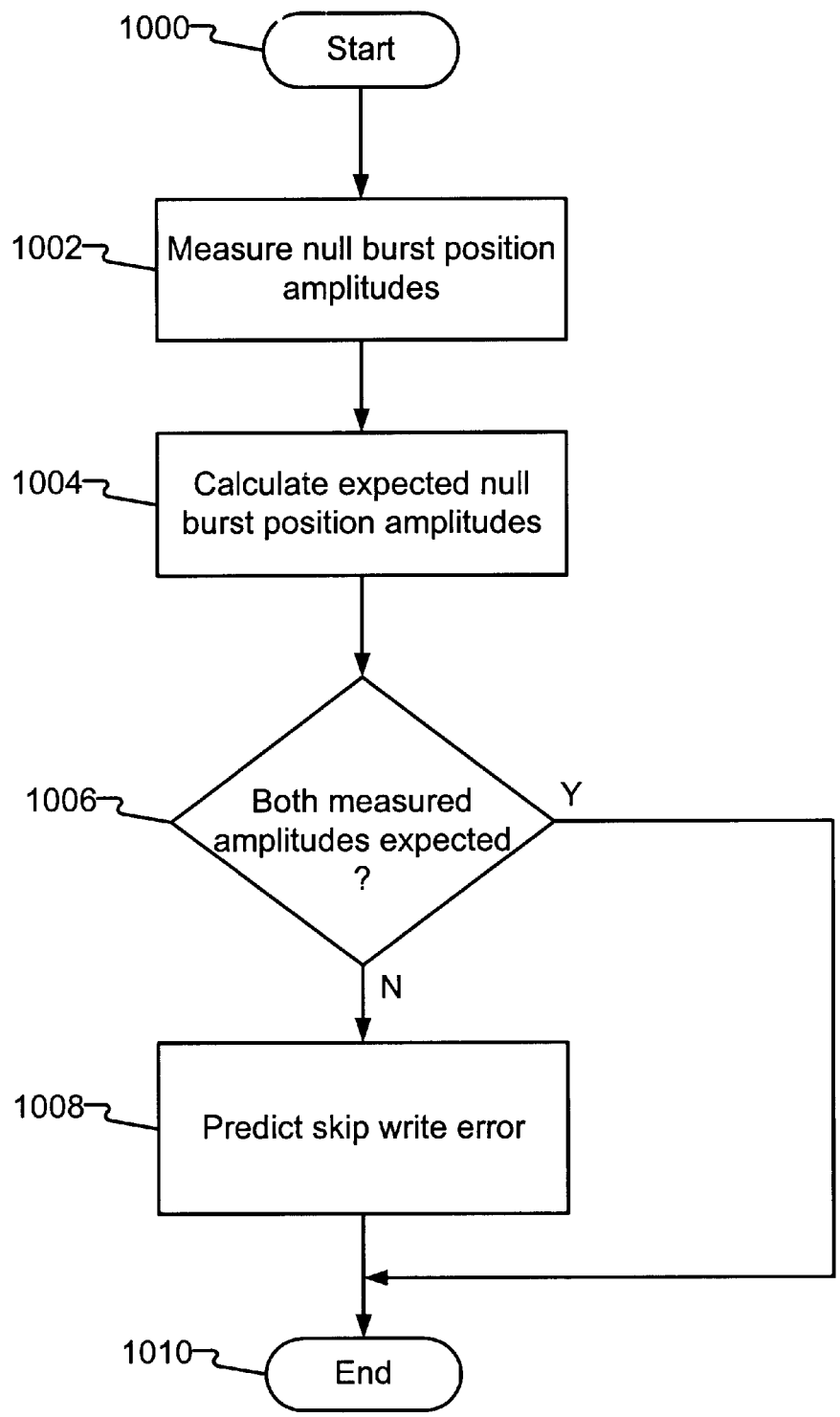
FIG. 10 is a flow chart illustrating exemplary method steps for predicting a skip-write error in an embodiment of the present invention.

FIG. 10 is a flow chart illustrating exemplary method steps for predicting a skip-write error in an embodiment of the present invention. Control initially transfers to a starting operation 1000 wherein initialization processing occurs. Control then transfers to a measuring operation 1002 wherein the amplitudes of null burst positions are measured. Preferably, in the measuring operation 1002, a null burst position quadrature amplitude is measured and a null burst position normal amplitude is measured. Control then transfers to a calculating operation 1004 wherein expected null burst position amplitudes are calculated. The calculating operation 1004 includes calculating an expected null burst position quadrature amplitude and an expected null burst position normal amplitude. Control then transfers to a comparing operation 1006 wherein the measured null burst position amplitudes (from the measuring operation 1002) are compared to the expected null burst position amplitudes (from the calculating operation 1004). In the comparing operation 1006 the measured null burst position normal amplitude is compared to the expected null burst position normal amplitude and the measured null burst position quadrature amplitude is compared to the expected null burst position quadrature amplitude.

If the measured null burst position normal amplitude does not substantially equal the expected null burst position normal amplitude or the measured null burst position quadrature amplitude is not substantially equal to the expected null burst position quadrature amplitude, then control transfers to a predicting operation 1008. Preferably, in the comparing operation 1006 it is determined whether the measured null burst position amplitudes differ from the respective expected null burst position amplitudes by a predetermined amount. The predetermined amount can be any amount suitable to the environment and may depend on such factors as hardware tolerances and system parameters. Thus, if the measured null burst position quadrature amplitude differs from the expected null burst position quadrature amplitude by a predetermined amount, then the measured null burst position quadrature amplitude is not substantially equal to the expected null burst position quadrature amplitude. Likewise, if the measured null burst position normal amplitude differs from the expected null burst position normal amplitude by a predetermined amount, then the measured null burst position normal amplitude is not substantially equal to the expected null burst position normal amplitude. In the predicting operation 1008, it is predicted that an off-track write fault has occurred or will occur. The predicting operation 1008 can include, but is not limited to, setting a flag in memory or setting a control line in logic to indicate an off-rack write fault. If the measured null burst position amplitudes are substantially equal to the expected null burst position amplitudes in the comparing operation 1006, control transfers to an end operation 1010. Also, after the predicting operation 1008 is executed, control transfers to the end operation 1010.

In summary, one embodiment of the present invention may be viewed as an efficient side-by-side recording head (such as 118) positioning system that can be used to predict various types of write faults in a disc drive 100. Alternatively, this embodiment may be viewed as a disc drive (such as 100) that has a data storage disc (such as 108) rotatably mounted on a spin motor (such as 106). An actuator (such as 110) mounted adjacent the disc (such as 108) positions a transducer (such as 118) over the data storage disc. The transducer (such as 118) includes a read element (such as 312) with a read gap (such as 302) having a center (such as 324), and a write element (such as 314) having a write gap (such as 304), mounted side-by-side on a trailing edge (such as 402) of a slider (such as 400), wherein the center (such as 324) of the read gap (such as 302) is substantially aligned with the trailing edge (such as 320) of the write gap (such as 304). The data storage disc (such as 108) has a plurality of concentric tracks (such as 152) defined on a surface thereof and a plurality of radial servo sector wedges (such as 150) spaced around the disc defining data sectors (such as 154) between the servo sector wedges (such as 150). Each servo sector (such as 150) has a leading edge (such as is indicated by gap 266) and a trailing edge (such as is indicated by gap 282) and data can be written to a data sector (such as 154) up to the leading edge (such as the beginning of gap 266) of each of the servo sectors (such as 150), and data can be written immediately adjacent a trailing edge (such as at the end of gap 282) of the servo sectors in a following data sector (such as 154). Preferably such a disc (such as 108) has more than 1024 servo sector wedges (such as 150) spaced around the disc.

Each of the servo sectors (such as 150) preferably has a leading servo address mark (such as 268) delimited by no mark preceding the mark, a plurality of Gray coded low-order track address bits (such as 270) having a unique value on each track (such as 152) at the same radial position on every track, the number of low-order track address bits being sufficient to identify a change in radial position of the transducer (such as 118), a single circumferential position bit (such as 272) to identify a servo sector number relative to a modulus equal to the number of bits in a high-order track address plus 1, and a null burst position error signal normal (such as 278) to define a track center and a null burst position error signal quadrature (such as 280) to define a half-track center, wherein each null burst encodes at least one null transition. Preferably a second servo address mark (such as 276) follows the null bursts in the servo sector (such as 150).

In this exemplary embodiment of the disc drive (such as 100), a recording failure can be predicted by measuring (such as 802) the time elapsed from the moment the read element (such as 312) passes over a servo address mark (such as 268) in a servo sector (such as 150) and another servo sector (such as 150). Given the known rotational velocity of the disc and rotational distance between adjacent servo sectors (such as 150), an expected time delay between servo address marks (such as 268) is calculated (such as 804). The expected time delay is compared (such as 806) to the measured elapsed time, and if the measured time exceeds the expected time delay by a predetermined amount, a sector overwrite is predicted (such as 808).

A recording failure may be predicted by steps of measuring (such as 902) the null burst position normal (such as 278) and null burst position quadrature (such as 280) in the servo sectors (such as 150), comparing (such as 906) an expected null burst position normal (such as 278) and null burst position quadrature (such as 280) sequence to detect a difference, and predicting (such as 908) an off-track write fault if the measured null burst sequence differs from the expected sequence by a predetermined amount. A recording failure may be predicted by steps of measuring (such as 1002) an amplitude of the null burst position normal and null burst position quadrature signals, comparing (such as 1006) the measured amplitudes to an expected null burst position normal and null burst position quadrature signal amplitude, and predicting (such as 1008) a skip write error if the measured amplitude differs from the expected amplitude by a predetermined amount.

Alternatively, an embodiment of the invention may be viewed as a disc drive (such as 100) having a data storage disc (such as 108), an actuator (such as 110) for positioning a transducer (such as 118) over the data storage disc and a disc controller for communicating with a host computer in which the disc controller controls position of the actuator (such as 110) and controls access to data sectors (such as 154) in tracks (such as 152) on the data storage disc. Each disc has a plurality of radial servo sectors (such as 150) defined on a surface thereof and a plurality of concentric tracks (such as 152) each having data sectors (such as 154) spaced apart by the servo sectors on the track; and means for predicting (such as 808, 908, and 1008) recording failures from interpreting servo sector information sensed from the servo sectors on the disc.

It will be clear that the present invention is well adapted to attain the ends and advantages mentioned as well as those inherent therein. While presently preferred embodiments have been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method for detecting a recording failure comprising steps of:
   (a) measuring an amount of time elapsed from a moment a read element passes over a leading servo address mark in one servo sector and a next servo sector address mark;

(b) calculating an expected time delay between servo address marks given a velocity and a distance between adjacent servo sectors; and (c) predicting an adjacent sector overwrite if the measured time exceeds the expected time delay by a predetermined amount, and otherwise generally not predicting an adjacent sector overwrite.

2. The method according to claim 1 further comprising steps of:

(d) measuring the null burst position normal and null burst position quadrature in the servo sectors;

(e) comparing an expected null burst position normal and null burst position quadrature sequence to detect a difference; and (f) predicting an off-track write fault if the measured null burst sequence differs from the expected sequence by a predetermined amount.

3. The method according to claim 2 further comprising steps of:

(g) measuring amplitudes of the null burst position normal and the null burst position quadrature signals;

(h) comparing the measured amplitudes to an expected null burst position normal amplitude and an expected null burst position quadrature signal amplitude;

(i) predicting a skip write error if one of the measured amplitudes differs from the expected amplitude by a predetermined amount.

4. The method according to claim 1 further comprising steps of:

(d) measuring amplitudes of the null burst position normal and the null burst position quadrature signals;

(e) comparing the measured amplitudes to an expected null burst position normal amplitude and an expected null burst position quadrature signal amplitude;

(f) predicting a skip write error if one of the measured amplitudes differs from the expected amplitude by a predetermined amount.

5. An apparatus a drive motor to move a storage medium and an actuator carrying a transducer over the medium for reading data from and writing data to tracks defined on the medium, wherein each track further includes alternating servo sectors and data sectors spaced on the medium, and each servo sector comprises a leading servo address mark, Gray coded address bits comprising a first portion low order address stored in a parallel low Gray code and a second portion high order address stored in a serial high Gray code, a null burst position error signal normal to define a track center and a null burst position error signal quadrature to define a half-track center, and a second servo address mark following the null bursts in the servo sector.

6. The disc drive according to claim 5 further comprising steps of:

(d) measuring an amount of time elapsed from the moment the read element passes over the leading servo address mark in one servo sector and a next servo sector address mark;

(e) calculating an expected time delay between servo address marks given the known rotational velocity of the disc and rotational distance between adjacent servo sectors; and (f) predicting an adjacent sector overwrite if the measured time exceeds the expected time delay by a predetermined amount.

7. A disc drive comprising:

a stack having at least one data storage disc;

each disc having a plurality of radial servo sectors defined on a surface thereof and a plurality of concentric tracks each having data sectors spaced apart by the servo sectors on the track;

an actuator for positioning a transducer over the data storage disc and a disc controller for communicating with a host computer, the disc controller controlling position of the actuator and controlling access to data sectors in tracks art the data storage disc; and means for predicting recording failures by interpreting servo sector information detected from the servo sectors on the disc.

8. The disc drive of claim 7 wherein the transducer includes a read element end a write element mounted in a side-by-side relation on a slider carried by the actuator.

9. The disc drive of claim 8 wherein the read element comprises a first shield and a second shield defining a read gap having a center and the write element comprises a first pole and a second pole defining a write gap with a trading edge and the center of the read gap is substantially aligned with the trailing edge of the write gap.

10. The disc drive of claim 7 wherein each servo sector comprises:

a leading servo address mark;

a plurality of Gray coded low-order track address bits having a unique value on each track at the same radial position on every track, the number of low-order track address bits being sufficient to identify a change in radial position of the transducer;

a single circumferential position bit to identify a servo sector number relative to a modulus equal to the number of bits in a high-order track address plus 1; and a null burst position error signal normal to define a track center and a null burst position error signal quadrature to define a half-track center, wherein each null burst encodes at least one null transition.

* * * * *